United States Patent
Baumann et al.

(10) Patent No.: US 6,289,750 B1
(45) Date of Patent: Sep. 18, 2001

(54) DEVICE FOR MEASURING TENSILE STRESS DISTRIBUTION IN A METAL STRIP

(75) Inventors: Joachim Baumann, München; Andre Berghs, Neunkirchen; Martin Beyfuss; Felix Türk, both of München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/380,144
(22) PCT Filed: Feb. 18, 1998
(86) PCT No.: PCT/DE98/00486
§ 371 Date: Jan. 10, 2000
§ 102(e) Date: Jan. 10, 2000
(87) PCT Pub. No.: WO98/38482
PCT Pub. Date: Sep. 3, 1998

(30) Foreign Application Priority Data

Feb. 26, 1997 (DE) ................................. 197 07 691
Jan. 29, 1998 (DE) ................................. 198 03 260

(51) Int. Cl.[7] ....................................................... G01L 1/02
(52) U.S. Cl. ........................................ 73/862.583; 73/160
(58) Field of Search .............................. 73/160, 862.451, 73/862.453, 862.392, 862.59, 862.581, 862.583, 862.637

(56) References Cited

U.S. PATENT DOCUMENTS

| | | |
|---|---|---|
| 3,538,765 | 11/1970 | Jesinghaus et al. . |
| 3,718,034 | 2/1973 | Swearingen . |
| 3,743,197 * | 7/1973 | Hawkins .................................. 226/7 |
| 3,850,031 | 11/1974 | Schwenzfeier et al. . |
| 3,902,644 * | 9/1975 | Bous ...................................... 226/44 |
| 4,602,475 * | 7/1986 | Piesczek .................................... 57/22 |
| 4,711,133 | 12/1987 | Berglund . |

FOREIGN PATENT DOCUMENTS

| | | |
|---|---|---|
| 1 573 712 | 5/1970 | (DE) . |
| 2 030 409 | 2/1971 | (DE) . |
| 26 17 958 | 11/1976 | (DE) . |
| 31 30 572 | 3/1982 | (DE) . |
| 0 064 216 | 11/1982 | (EP) . |

\* cited by examiner

*Primary Examiner*—Max Noori
(74) *Attorney, Agent, or Firm*—Kenyon & Kenyon

(57) ABSTRACT

A method for measuring the tensile stress distribution over the width of the metal strip is provided. In order to measure the tensile stress in a metal strip between two roll stands or between a roll stand and a coiler or a guide roll, a force is exerted on the metal strip using a suction device and effecting a deflection of the metal strip. The deflection of the metal strip is measured and used for calculating the tensile stress distribution over the width of the metal strip.

17 Claims, 5 Drawing Sheets

DEVICE FOR MEASURING TENSILE STRESS DISTRIBUTION IN A METAL STRIP

FIELD OF THE INVENTION

The present invention relates to a method and a device for measuring the tensile stress distribution in a metal strip between two roll stands or between a roll stand and a coiler (winder). In addition, the present invention can be used in conjunction with S rolls and blooming-mill stands.

BACKGROUND INFORMATION

During the rolling of metal strips, in particular during cold rolling, the tensile stress distribution in the metal strip, along the metal width, has to be determined on line i.e., it usually has to be measured, since the tensile stress distribution is the decisive variable for controlling the flatness of the metal strip.

For example, metal metal strip is guided over a measuring roll, i.e., a segmented guide roll, which has piezoelectric pressure sensors at intervals of about 2–5 cm. The force acting on the sensors in this case is a measure of the tensile stress distress distribution. The method involves contract— and can therefore leave behind impressions in the metal and, in addition, involves wear and is thus maintenance intensive.

Furthermore, German Patent No. 26 17 958 describes a device for measuring the tensile stress of a metal strip, oscillatory waves being generated in the metal strip using electric hammers, and their propagation being measured. This method is also subject to the disadvantages mentioned above.

Furthermore, German Patent No. 31 30 572 describes the operation of measuring the tensile stress of a metal strip using ultrasound. To this end, the metal strip is made to oscillate using ultrasound, and the propagation of this oscillation is measured. However, it has been shown that this method is suitable only in exceptional cases, in particular in the case of particularly thin metal strips, because of the low energy transmission when ultrasound is used.

U.S. Pat. No. 3,538,756 descries a system in which a constant stream of air is blown against the metal strip in order to push the latter away for the purpose of achieving a deflection of the metal strip.

SUMMARY

An object of the present invention is to provide a device for avoiding the disadvantages described above.

The device according to the present invention for measuring the tensile stress distribution in a metal strip between two roll stands, between a roll stand and a coiler, in a blooming-mill stand or upstream or downstream of a guide roll has a deflection device (arranged upstream or downstream of a roll) for deflecting the metal strip, a measuring device for measuring the deflection of the metal strip and a computing device for calculating the tensile stress distribution as a function of the deflection of the metal strip, the deflection device being designed as a suction device to apply suction to the metal strip. This device, on the one hand, makes it possible to measure the tensile stress or tensile stress distribution without damaging the metal strip and, on the other hand, supplies a particularly strong and precise measurement signal, which permits particularly precise determination of the tensile stress or tensile stress distribution in the metal strip. The device according to the present invention is also considerably more straightforward and cost-effective than a measuring roll.

DETAILED DESCRIPTION

Figure 1:
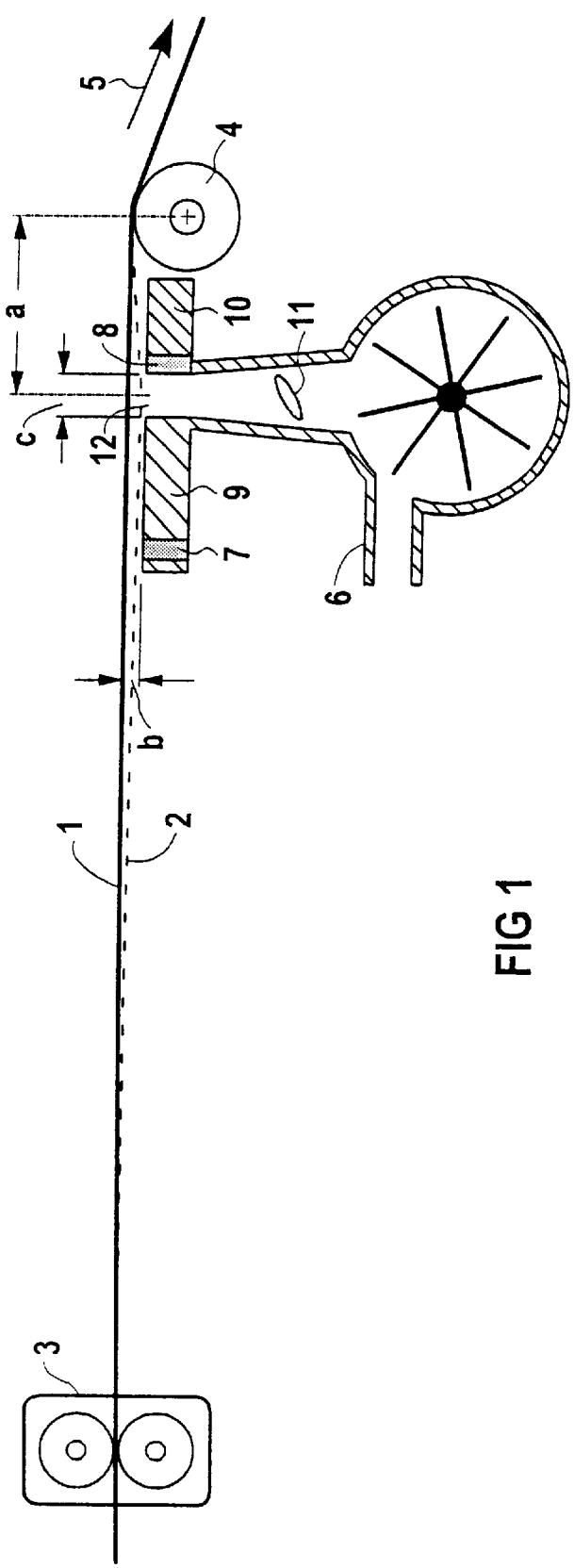
FIG. 1 shows an exemplary embodiment of a suction device according to the present invention.

FIG. 1 shows an exemplary embodiment of a device according to the present invention for measuring the tensile stress distribution in a metal strip 1. Metal strip 1 runs out of a roll stand 3 and is guided in the direction of arrow 5 using a guide roll 4. A suction device 6 is arranged at a distance a, for example, 10 to 30 cm, f rom guide roll 4. By selecting distance a to be 10 to 30 cm, particularly good spatial resolution of the tensile stress over the strip width is achieved. Plate 9 and 10 are arranged at the upper end of suction device 6. The air stream that is taken in by the suction device effects a deflection of metal strip 1. This deflection is indicated by dashed line 2. Integrated into plate 9 and 10 of the suction device are deflection sensors 7 and 8, which measure deflection 2 of metal strip 1. Deflection sensors 7 and 8 are designed as eddy-current sensors, capacitive distance sensors, optical path sensors or ultrasonic distance sensors. The design as eddy-current sensors, in particular time-synchronized eddy-current sensors, is particularly advantageous. The distance sensors are particularly advantageously designed as rows of sensors over the width of metal strip 1.

Suction device 6 has a rotary throttle 11. Using this rotary throttle 11, which the air stream has been taken in is modulated. The air stream is modulated at, for example, a frequency of 5 to 40 Hz, in particular at a frequency of 5 to 20 Hz. In this way, without additional damping, a virtually quasi-static deflection is achieved, so that the result, even without additional damping measures, is a deflection that is essentially proportional to the exciting force and inversely proportional to the tensile stress distribution. The tensile stress distribution may be measured particularly precisely in this way. It has proven to be particularly advantageous to excite metal strip 1 at a frequency which lies below its resonant frequency. Surprisingly, a more precise measurement of the tensile stress distribution may be achieved in this frequency range.

Plates 9 and 10 are arranged at a distance b of, for example, 1 to 10 mm, in particular 5 mm, from metal strip 1. A gap of width c is provided between metal plates 9 and 10. This gap is advantageously 0.5 cm to 5 wide. A gap width c=2 cm is particularly advantageous.

Plates 9 and 10 are about 20 cm wide, with the result that the vacuum produced by suction device 6 acts on a finite area of metal strip 1.

In order to evaluate the measurement signals supplied by distance sensors 7 and 8, provision is made for an evaluation device (not illustrated).

Suction device 6 is dimensioned such that a vacuum between 5 and 50, for example, mbar is produced between plates 9 and 10 and metal strip 1.

Figure 2:
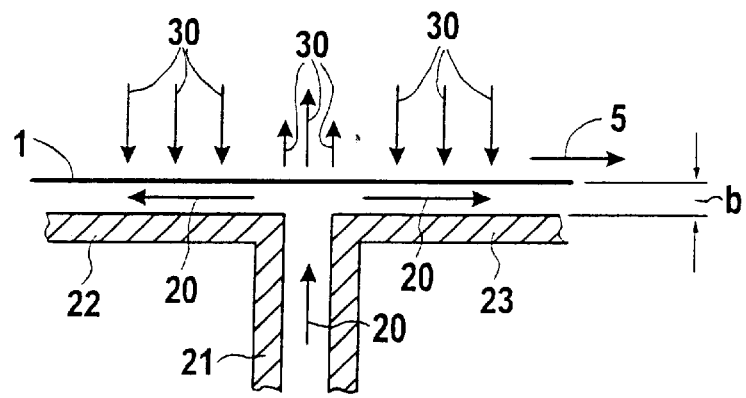
FIG. 2 shows an alternative embodiment of a suction device according to the present invention.
Figure 3:
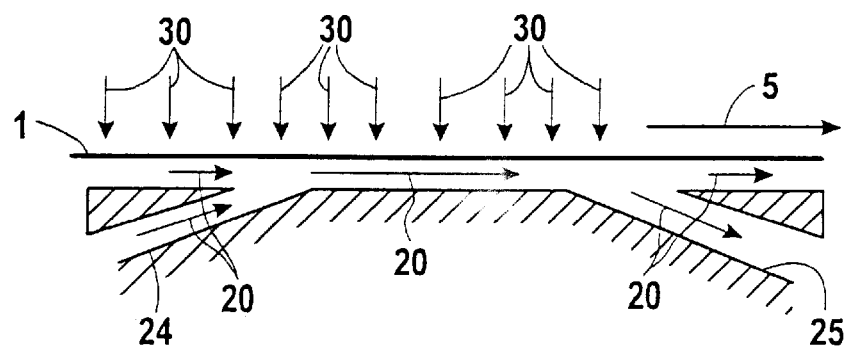
FIG. 3 shows a further alternative embodiment of a suction device according to the present invention.

FIG. 2 shows an alternative embodiment of a suction device 21. In FIGS. 2 and 3, the arrows identified by reference symbol 20 indicate the movement of the air (an air stream pulsed at a frequency between 5 and 20 Hz), and the arrows designated by 30 indicate the forces acting on metal strip 1 on account of the air movement. By means of suction device 21, air is blown towards metal strip 1 and led away laterally parallel, and counter, to the strip running direction 5. The velocity of the air and distance b between plates 22 and 23, which are arranged on suction device 21, and metal strip 1 are in such a relationship that the hydrodynamic paradox is in effect. This means that, although air is blown towards metal strip 1, metal strip 1 is attracted by suction device 21 because of the high air velocity.

This principle also forms the basis of the configuration of a suction device 24 according to FIG. 3, FIG. 3 illustrating a particularly advantageous embodiment of the basic principle described in FIG. 2. Using suction device 24, air is blown towards metal strip 1. The pressure of this air is so high that the flow velocity of the air allows the hydrodynamic paradox to take effect: metal strip 1 is attracted by suction device 24. In addition, provision may be made for a suction duct 25, by which air additionally taken in. The configuration according to FIG. 3 allows high flow velocities of the air between metal strip 1 and suction device 24, which in turn leads to the metal strip being attracted to a pronounced extent.

Figure 4:
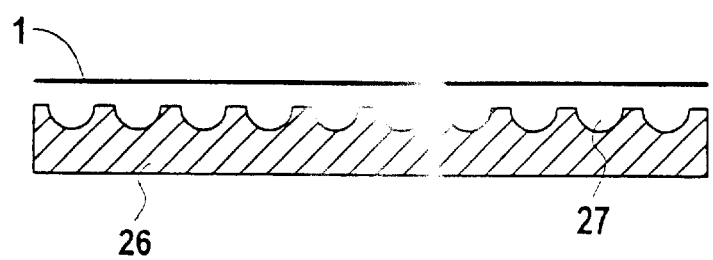
FIG. 4 shows an advantageous embodiment of slops of a suction device according to the present invention.

FIG. 4 shows a cross section through a metal strip 1 and a plate 26. Plate 26 is a particularly advantageous embodiment for plates 9, 10, 22 and 23 and for that surface of suction device 24 which faces metal strip 1. Milled into plate 26 are channels 27 that extend in the direction in which the strip runs. The flow direction of the air under metal strip 1 can be influenced in this way. In addition, provision may be made to control the flow velocity of the air in channels 27 individually, and thus to define measurement zones which may be subjected to a specific force.

In the case of hot-rolling stands, there is the possibility, instead of using air, of spraying a liquid (water, emulsion or the like) in a pulsed manner at high pressure onto the material being rolled, in order to produce a periodic force in this way. This emulsion simultaneously effects cooling of the deflection sensors, which do not withstand the high temperatures during hot rolling (up to 1000° C.) without cooling.

As a result of various interfering influences during the deflection of metal strip 1, distance sensors 7 and 8 supply very noisy measurement signals. The measurement signals are therefore filtered. The signal filtering is advantageously effected using a digital fit algorithm or an FFT analysis. Metal strip 1 is deflected sinusoidally. The time profile of the measurement signal for each period is therefore ideally a sine wave. However, interference signals, in particular the resonant oscillations of metal strip 1, are superimposed on this sine-wave signal. After each complete period, therefore, a sine curve is fitted to the measurement signal (minimization of the squares of the errors). Since the phase and frequency are known, the signal offset (basic distance between the sensors) and the amplitude are the only fit parameters. Amplitude value $A_F$, ascertained is then converted into the tensile stress.

Figure 5:
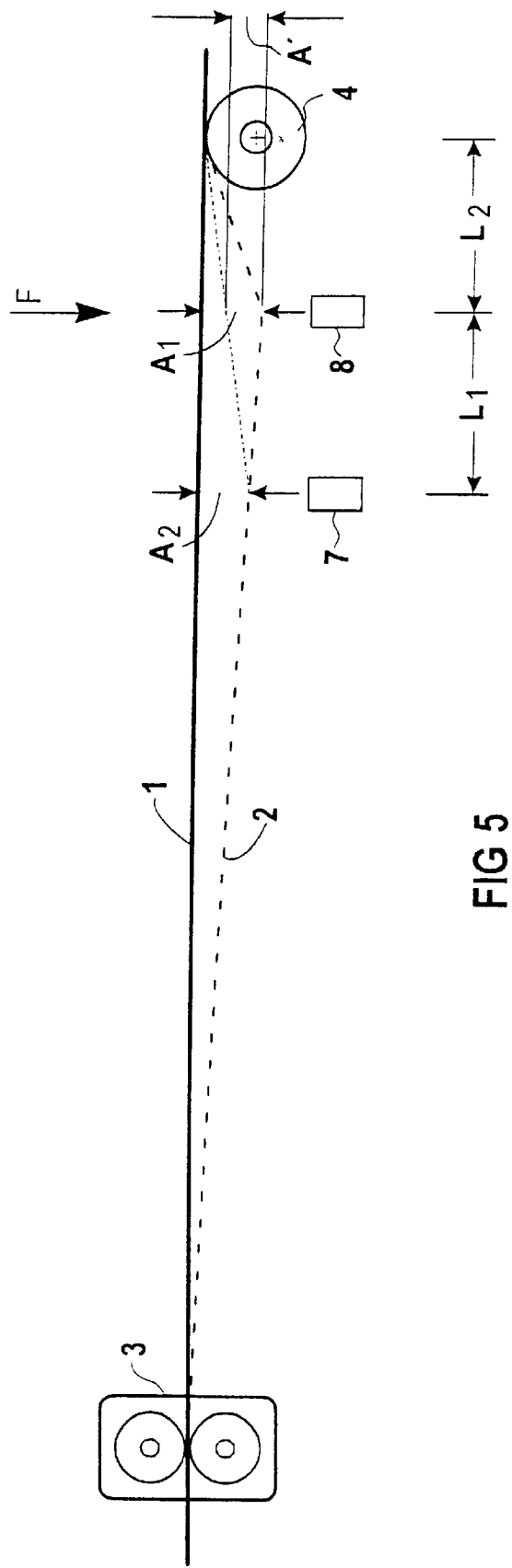
FIG. 5 shows an arrangement of sensors, according to the present invention.

A further distinct improvement in the filtering is achieved by using two distance sensors 7 and 8 in accordance with the exemplary embodiment from FIG. 1 and FIG. 5 and evaluating the expression $$A' = A_1 - \frac{L_2}{L_1 + L_2} A_2. \quad (1)$$

A' is a measure of the curvature of metal strip 1 at the location where the force is introduced. The curvature is low for long-wave resonant oscillations. These are therefore effectively filtered out. The forced deflection, on the other hand, produces a "kink" in metal strip 1 at the location where force is introduced. In expression A', therefore, the information content in relation to the metal-strip deflection that is forced by the suction device is considerably greater than in measurement signals $A_1$ and $A_2$ which are supplied by sensors 8 and 7.

Figure 6:
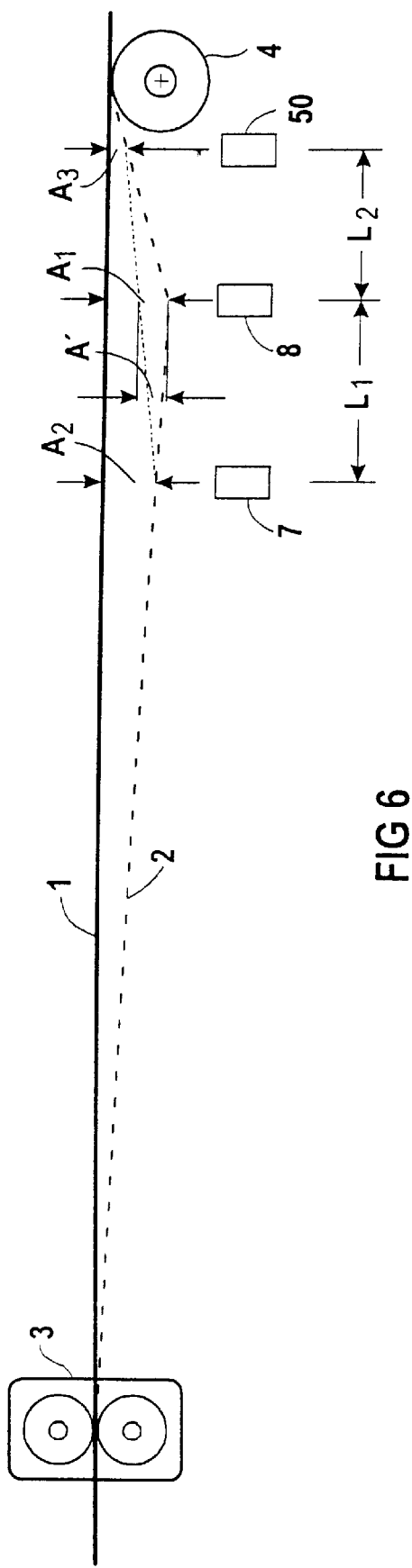
FIG. 6 shows an alternative arrangement of sensors, according to the present invention.

FIG. 6 shows the arrangement of three distance sensors, which are designed in particular as rows of sensors. In this case, a third distance sensor 50 is provided to measure distance $A_3$ In the case of using three distance sensors, the value for A' is advantageously corrected in accordance with $$A' = A_1 - \frac{L_2}{L_1 + L_2} A_2 - \frac{L_1}{L_1 + L_2} A_3. \quad (2)$$

In this way, errors as a result of non-round rolls or sagging of a roll may be compensated for.

By means of an FFT or a fit algorithm, an amplitude value $A'_F$ is formed values A', this amplitude value $A'_F$ corresponding in principle to amplitude value $A_F$ but being formed form values A' rather than from direct measurement values.

The conversion of amplitude distribution $A'_F(x)$ into a tensile stress distribution $\sigma(x)$ is effected in accordance with $$\sigma(x) = C(x)F(x)[1/A'_F(x) - 1/A_0] \quad (3).$$

Here, x designates the location coordinate along with width of metal strip 1.

$A'_F(X)$ is the measured amplitude distribution of the deflection, which is calculated in accordance with Equation 1 or Equation 2 and using the digital fit algorithm. F(x) is the force distribution with which metal strip 1 is deflected and it has to be determined once experimentally. C(x) is a proportionality factor, which includes the elastic constants of the material of metal strip 1. Because of the transverse contraction, given a homogeneous tensile stress distribution, the amplitude at the edge of the metal sheet is greater than in the center. Therefore, C(x) is a function of x. C(x) can be determined from finite-element calculations.

$1/A_0$ is a term that takes into account the flexural rigidity of the metal sheet. $A_0$ is the amplitude that is measured when the tensile stress is zero. Because of the flexural rigidity of metal strip 1, $A_0$ is finite. For thin metal strips, that is for metal strips that are thinner than 1 mm, $1/A_0$ can be set to be equal to zero.

Figure 7:
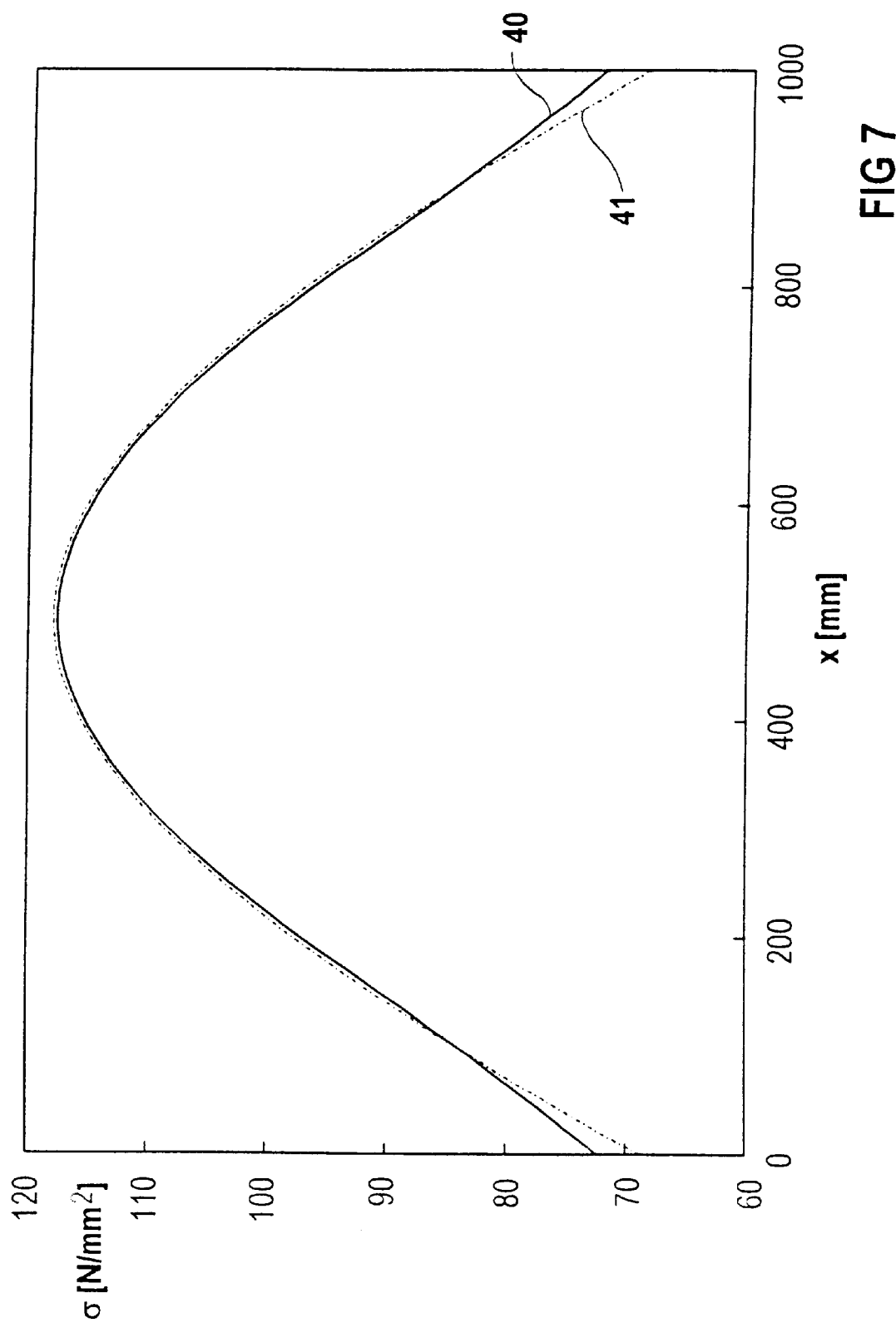
FIG. 7 shows a comparison between ascertained tensile stress and actual tensile stress.

FIG. 7 shows a curve 40, determined within the context of a finite-element simulation using the method according to the present invention, for tensile stress $\sigma$ in N/mm² in a metal strip, plotted against position x in mm on the metal strip in the transverse direction, in comparison with a curve 41 for tensile stress $\sigma$ in N/mm² to which the metal strip is subjected. The curve illustrates that, using the method according to the present invention, it is possible to ascertain tensile stress $\sigma$ in a metal strip particularly precisely.

What is claimed is:

1. A device for measuring the tensile stress distribution in a metal strip between two roll stands, between a roll stand and a coiler, in a blooming-mill stand, or upstream or downstream of a guide roll, comprising:
   a deflection device for deflecting the metal strip, the deflection device including a suction device for applying a suction to the metal strip;
   a measuring device for measuring the deflection of the metal strip; and
   computing device for determining the tensile stress distribution as a function of the deflection of the metal strip.

2. The device according to claim 1, wherein the suction device generates a periodic air stream for periodic deflection of the metal strip.

3. The device according to claim 2, wherein the suction device generates a flexure wave in a longitudinal direction of the metal strip.

4. The device according to claim 1, wherein the suction device includes a modulation device for generating the periodic air stream at a frequency of between 5 and 40 Hz, the suction device periodically deflecting the metal strip.

5. The device according to claim 4, wherein the frequency is between 5 and 20 Hz.

6. The device according to claim 1, wherein the suction device is arranged at a distance of between 1 to 10 mm from the metal strip.

7. The device according to claim 6, wherein the suction device is arranged at 5 mm from the metal strip.

8. The device according to claim 1, wherein the suction device includes air-feed plates, which, with the metal strip, form an air duct.

9. The device according to claim 8, wherein the air-feed plates are between 5 and 30 cm wide.

10. The device according to claim 9, wherein the air-feed plates are 20 cm wide.

11. The device according to claim 1, further comprising:
    a guide roll for guiding the metal strip.

12. The device according to claim 11, wherein the suction device is arrange 10 to 30 cm away from the guide roll.

13. The device according to claim 1, wherein the suction device includes a compressed-air device for blowing compressed air at the metal strip at a velocity above a velocity from which a hydrodynamic paradox takes effect.

14. The device according to claim 1, wherein the measuring device includes at least two deflection sensors.

15. The device according to claim 14, wherein the at least two deflection sensors are arranged in rows.

16. The device according to claim 15, wherein the at least two deflection sensors include at least three deflection sensors.

17. The device according to claim 4, wherein:
    the modulation device includes a rotary throttle.

* * * * *